ical iron ore reduction processes, impure ore feed is reduced in a fluid bed with reducing gases at high temperatures ranging from about 900° to 1600° F. The reduced product generally contains about 65 to 98+% metallic iron, along with minor portions of unreduced or partially reduced ore, i.e., $Fe_2O_3$, $Fe_3O_4$ and FeO plus gangue materials comprising primarily siliceous impurities which were present in the raw ore.

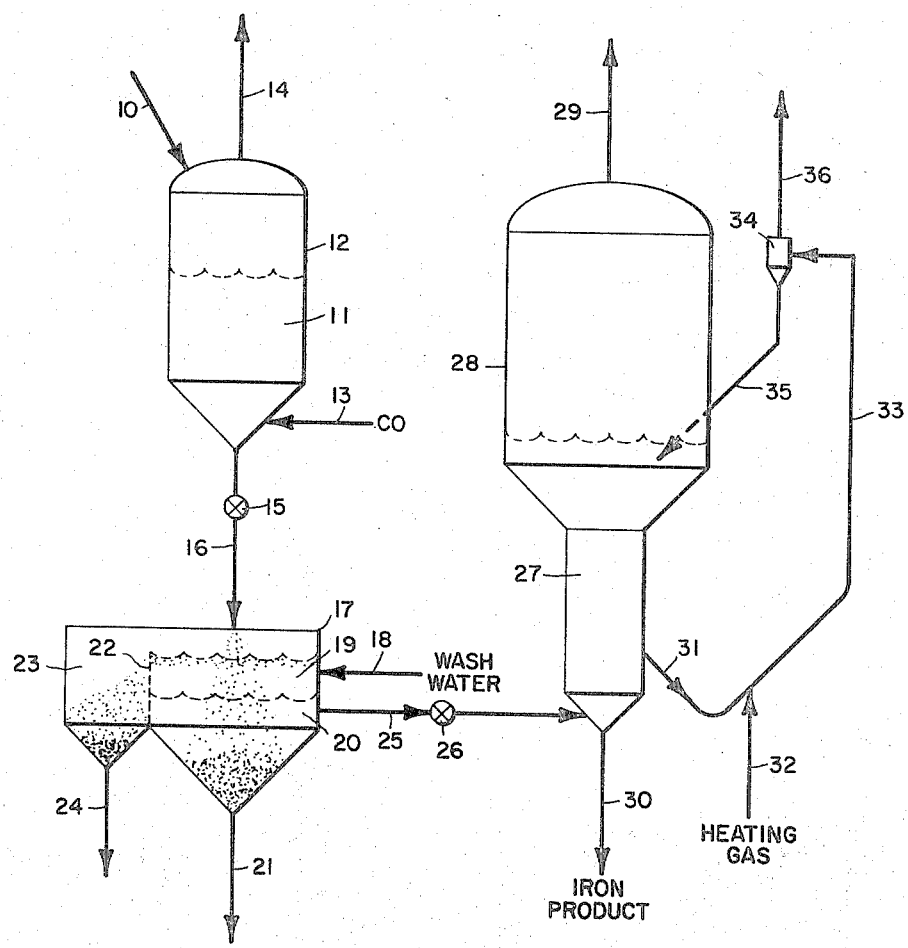

3,342,588
PURIFICATION OF IRON

Ralph Burgess Mason, Denham Springs, La., assignor to Esso Research and Engineering Company, a corporation of Delaware
Filed Nov. 30, 1966, Ser. No. 598,024
14 Claims. (Cl. 75—.5)

This is a continuation-in-part of applications Ser. Nos. 299,025 and 299,026, both filed July 31, 1963 and both now abandoned. This invention relates to the purification of iron, especially particulate iron having a very small particle size. More particularly, it relates to the purification of particulate iron made by the reduction of iron ore in a fluidized bed.

In fluidized iron ore reduction processes, impure ore feed is reduced in a fluid bed with reducing gases at high temperatures ranging from about 900° to 1600° F. The reduced product generally contains about 65 to 98+% metallic iron, along with minor portions of unreduced or partially reduced ore, i.e., $Fe_2O_3$, $Fe_3O_4$ and FeO plus gangue materials comprising primarily siliceous impurities which were present in the raw ore.

In order to make steel from the reduced ore product from a fluidized ore reduction process, it has generally been necessary to purify the product by separating the metallic iron from the gangue and unreduced or partially reduced ores. Magnetic separation and mechanical separation techniques have been employed; however, such methods have generally been inadequate for producing high-purity ore at reasonable expense.

It has heretofore been necessary to melt the iron at high temperatures above about 2700° to 2800° F. in order to separate it from the impurities. Such a high temperature process requires a great deal of heat and expensive heat-resistant equipment. Melt purification processes have, therefore, been generally prohibitive in cost for purifying iron from a fluidized iron ore reduction process.

It has now been found that high purity iron can be recovered from mixtures of particulate iron and impurities in accordance with the present invention.

This invention contemplates forming a moving bed of particulate iron and impurities, adding iron and impurities to the top of the moving bed and passing carbon monoxide or carbon monoxide-containing gas upwardly through the bed at a rate sufficient to maintain the particles as a moving bed but insufficient to fluidize the particles. The particulate iron is reacted with carbon monoxide to form iron carbonyl in accordance with the reaction:

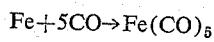

$$Fe + 5CO \rightarrow Fe(CO)_5$$

The gangue and other impurities which do not react with carbon monoxide are withdrawn from the bottom of the moving bed. The iron carbonyl is withdrawn from the bed and decomposed to liberate carbon monoxide and form a high-purity iron product.

The particulate iron and impurities are preferably substantially all in the particle size range from about 5 to 5000 microns, and averaging about 50 to 350 microns. Smaller particles tend to become entrained excessively in the ascending carbon monoxide gas unless the gas rate is uneconomically low. Larger particles can be used; however, they tend to resist reduction due to their low surface-to-volume ratio. Moreover, some large particles tend to plug the moving bed and stop the downward movement of the impurities and other iron particles. Generally, superficial gas velocities up through the moving bed of about 0.001 to 0.5 ft./sec., and preferably 0.002 to 0.2 ft./sec., are required to maintain and react with the moving bed without fluidizing it.

The term "moving bed" as employed herein contemplates a slightly expanded bed of iron particles. It requires the passage of a gas, e.g., carbon monoxide, through a bed of particles at a rate too low to fluidize the bed, but high enough to agitate the particles slightly and keep them from resting with their full weight on adjacent and lower particles. Thus, the gas can act somewhat as a "lubricant" which makes the bed free-flowing so that it can move downwardly without binding or plugging, as sometimes occurs in a fixed bed where the particles are in a more compact or compressed state. On the other hand, the particles in a moving bed are not fluidized; therefore, although they are slightly agitated, they do not circulate about through the bed to any significant extent. Thus, there is no substantial back-mixing and a moving bed of iron particles tends to move as a plug or unit, while simultaneously it is collapsing due to the conversion of solid iron particles to liquid or gaseous iron carbonyl. The moving bed of this process thus employs the range of relative gas flow rates greater than those involved in a completely "fixed" bed and lower than the rates used in a fluidized bed.

In accordance with the present invention, the temperature of the moving bed ranges from about 100° to 350° F., preferably about 200° to 275° F. While lower temperatures tend to be more favorable with respect to the equilibrium of the carbonyl formation reaction, the kinetics of the reaction at lower temperatures are so low as to make the process unfeasible. Conversely, while higher temperatures improve the reaction kinetics, they result in unfavorable equilibrium between the carbonyl product and the iron and carbon monoxide reactants.

Preferably the moving bed is maintained under a total pressure of about 100 to 2000 p.s.i.g. However, total pressures ranging from about 200 to 500 p.s.i.g. with carbon monoxide partial pressures of at least 50 p.s.i.g. are preferred to produce excellent yields of iron carbonyl product at minimal expense. Still higher pressures can be used; however, the improvement in the process will be slight and the additional expense required to operate at higher pressures may be prohibitive.

Iron carbonyl can be formed in the moving bed as either a gas or a liquid by controlling the upflowing gas rate. A low gas rate tends to produce a liquid product, while a high rate volatilizes the carbonyl as it forms and results in a gaseous product. The upflowing gas rate is kept below about 100 to 100,000 ft.³/100 lbs. of carbonyl formed to avoid volatilizing the product when a liquid product is desired. The exact gas rate at which excessive volatilization occurs depends on the temperature and pressure in the moving bed. Thus, high temperatures and low pressures favor volatilization of the carbonyl and require low gas rates if a liquid product is desired. Conversely, low temperatures and high pressures tend to produce a liquid product and high ascending gas rates are required if a gaseous carbonyl product is to be produced.

When pure carbon monoxide is added to the moving bed a liquid product will generally be produced if the conversion of the carbon monoxide is high. This is because there will be insufficient gas remaining to volatilize the carbonyl. On the other hand, when an inert gas is added, higher carbon monoxide conversions can be achieved without liquefying the carbonyl product. For example, the maximum conversions which are compatible with vapor-phase removal of iron carbonyl are compared below for pure carbon monoxide and a one-to-one synthesis gas (50% hydrogen, 50% carbon monoxide).

| Pressure, p.s.i.g. | CO Utilization at 230° F. for Vapor Phase Removal | |
| --- | --- | --- |
| | Carbon Monoxide | 1/1 Synthesis Gas |
| 200 | 30.3 | 60.6 |
| 500 | 14.2 | 28.4 |

Total gas rates of about 150 to 2500 v./v./hr. or higher can be used to produce carbon monoxide conversions of 20 to 70% based on total feed. Preferably the rate at which gas is fed to the moving bed ranges from about 500 to 2000 v./v./hr. (volume of gas per hour per volume of moving bed). The higher the gas rate the lower the carbon monoxide conversion will be and, consequently, the less will be the iron carbonyl concentration as compared to the upflowing gas rate. The total exit gas rates from the moving bed will determine at any given set of moving bed temperatures and pressures whether the carbonyl product is to be gaseous or liquid. Illustrative maximum exit gas rates to produce a carbonyl product which is at least partially liquid are shown below:

| Temp., °F. | Total System Pressure [1] (p.s.i.g.) | Maximum Exit Gas Rates [2] |
| --- | --- | --- |
| 100-150 | 200-500 | 10,600-92,500 |
| 150-200 | 200-500 | 3,500-25,600 |
| 200-250 | 200-500 | 1,680-8,800 |
| 250-300 | 200-500 | 415-4,300 |
| 300-350 | 200-500 | 83-1,240 |

[1] This includes total pressure of all gases present, e.g., partial pressure of carbon monoxide plus any inert gas.
[2] This is the exit gas rate in ft.³/100 lbs. Fe(CO)₅ of the gases leaving the carbonyl formation zone and includes unreacted carbon monoxide as well as any inert gases. At gas rates above these maximums, primarily gaseous carbonyl is formed.

In order to maximize the efficiency of the carbonyl formation reaction it is desirable to pretreat the particulate iron feed with carbon monoxide at temperatures in the range from about 200° to 400° F. and pressures in the range from about 500 to 2500 p.s.i.g. for at least about 10 minutes; and preferably about 100 to 400 minutes. The pretreatment will result in a preconditioned iron feed that is susceptible to rapid reaction with carbon monoxide. However, any pretreatment should be insufficient to convert substantial portions of the iron feed to iron carbonyl before the feed is added to the moving bed. The carbon monoxide pretreatment can be carried out under static or nonflow conditions to minimize utilization of carbon monoxide.

In a preferred embodiment of this invention the moving bed carbonyl formation process is employed in combination with a decomposition zone containing a fluidized bed of iron seed particles. Decomposition is achieved by maintaining the fluidized bed at high temperatures and low pressures. Preferably the temperature of the fluid bed will be in the range from 100° to 350° F., while the pressure will be less than about 100 p.s.i.g., preferably less than about 50 p.s.i.g. Higher pressures can be used; however, it will then be necessary to maintain higher temperatures in the decomposition zone in order to decompose the iron carbonyl to high purity iron and carbon monoxide products. Maintenance of the fluid bed at higher temperatures is undesirable since it adds considerable additional heat requirements and consequently increases the process operating expense. Also, decomposition temperatures above about 600° F. produce carbon deposits on the metallic iron.

Preferably the fluid bed in the decomposition zone is heated by withdrawing particles of seed iron and circulating them through a heater and then returning the heated particles to the fluid bed. The circulation rate will depend on the total heat requirements of the bed. It must, in any case, be sufficient to supply the endothermic heat of decomposition and any extraneous heat losses from the decomposition reactor. The use of the seed particles to provide heat is particularly desirable since prior techniques have been highly unsatisfactory. For example, when heat exchanger tubes are employed in the decomposition reactor to supply heat, the carbonyl will deposit metallic iron on the hot tubes, which not only makes it difficult to recover the iron, but also tends to insulate the tubes. Similarly, when heat is provided by radiation from the decomposition reactor walls, iron will tend to plate out on the walls, which again results in difficult recovery problems. It has also been considered to decompose iron carbonyl in a vapor space without contacting it with any hot surfaces. However, this technique produces particles which are so fine they are difficult to separate from the liberated carbon monoxide gas. Also, they may be pyrophoric due to high particle surface area per unit volume.

The iron carbonyl from the moving bed formation zone can be withdrawn as a gas and injected into the fluidized bed as a gas. Preferably, however, it is condensed out of the carbon monoxide and injected into the fluidized bed decomposition reactor as a liquid. This avoids the introduction of excessive gas in the decomposition zone, which is highly desirable to avoid the necessity of recompressing large quantities of carbon monoxide for recycle back to the moving bed formation zone. The condensation and separation of carbonyl from the unreacted carbon monoxide leaving the moving bed is especially desirable when carbonyl formation promoters such as ammonia, low-boiling mercaptans and amines or hydrogen sulfide are used to promote the carbonyl reaction. Thus, by separating the carbonyl from these promoters, the introduction of the promoters into the fluid bed decomposition reactor can be avoided. This minimizes pollution of the iron product and also provides for more rapid carbonyl decomposition.

In a more preferred embodiment of this invention liquid iron carbonyl is formed in the moving bed and is withdrawn near the bottom of the bed either separately, or more generally with the unreacted iron, unreduced iron ore and gangue. The withdrawn mixture is separated by settling to remove the heavier unreduced iron ore and unreacted iron particles which settle to the bottom of the liquid iron carbonyl. The gangue, which floats on top of the liquid carbonyl, is then removed by water washing or by washing with any other liquid which is immiscible in iron carbonyl.

When liquid carbonyl is introduced into the fluid bed decomposition zone at pressures less than about 100 p.s.i.g., it is important to feed the carbonyl at a temperature less than about 100° F. to avoid decomposition in the feed line, which will result in plugging the line with deposits of iron.

Additional carbon monoxide or inert gas can be added as desired in the fluid bed to optimize fluidization. Preferably, however, it is desirable to utilize the liberated carbon monoxide from the decomposition reaction to fluidize the iron particles in the bed.

The attached drawing shows a preferred embodiment of the invention employing a moving bed to produce liquid iron carbonyl, which is subsequently decomposed in a fluidized bed of iron particles to produce a highly pure iron product. Referring specifically to the drawing, a partially reduced iron ore having a particle size ranging from about 5 to 5000 microns is introduced via inlet 10 into moving bed 11 of carbonyl formation reactor 12. Carbon monoxide is introduced at inlet 13 into the bottom of the moving bed and passes upwardly through the bed at a rate which is sufficient to prevent particles therein from sticking and plugging, but insufficient to fluidize the bed. The carbon monoxide is introduced at temperatures preferably below about 100° F., since the carbonyl formation reaction is highly exothermic. Depending on the relative feed rates to the reactor, the heat of reaction will heat the moving bed to temperatures ranging from about 100° to 350° F. when the pressure is held at about 200 to 500 p.s.i.g. Any unreacted carbon monoxide exits from the reactor via outlet 14 and can be recovered and recycled if desired. The use of a moving bed in the carbonyl formation reactor is particularly advantageous since it avoids back mixing of the gangue and impurities with fresh incoming reduced iron feed. Thus, the particles in the moving bed gradually descend as the iron therein is reacted, and this allows the bed to collapse downwardly. The lower portions of the bed thus contain ever-increasing amounts of gangue and decreasing amounts of metallic iron, so that gangue and impurities can be withdrawn from the bottom of the bed without withdrawing any substantial amounts of unreacted iron. Another advantage of the moving bed is that losses of fines due to entrainment are minimized. Thus, the largest particles are always at the top of the bed, while the partially-consumed smaller particles are at lower levels in the bed and thus are trapped by the upper layers, which prevent the small particles from being carried out of the bed with the exciting carbon monoxide. Similarly, when the liquid carbonyl is produced, entrainment of droplets is minimized by the moving bed as compared to that which would occur in a fluidized bed formation zone. (Also, the carbon monoxide conversion efficiently is much higher in a moving bed since the feed rate is much lower and the contact time with the iron is correspondingly higher).

In this embodiment the iron carbonyl is formed as a liquid which drains to the bottom of the moving bed and is withdrawn through valve 15 and line 16 along with gangue, unreduced ore and unreacted iron particles. The withdrawn mixture is dropped into a separator 17 where it passes through a wash-water layer 19. The gangue material floats on top of the liquid carbonyl and is removed by the wash-water, which enters at inlet 18. The gangue is washed over weir 22 into gangue settling zone 23. The gangue can be recovered or discarded through outlet 24. Liquid carbonyl and heavy materials such as unreduced ore and unreacted metallic iron pass through the wash-water and form a lower zone 20. The solid materials are withdrawn via outlet 21, while the supernatant carbonyl is passed via line 25 and valve 26 into a fluid bed 27 of decomposition reactor 28. The iron carbonyl decomposes in the fluid bed, which is maintained at temperatures ranging from about 100° to 350° F. and pressures ranging from about 20 to 50 p.s.i.g. The liberated carbon monoxide constitutes the fluidizing medium for the fluid bed and passes upwardly through the bed and out of the reactor by means of line 29 as a high purity product which can be either recovered separately or recycled to the carbonyl formation reactor.

The decomposing carbonyl deposits layers of extremely high purity iron on the seed particles in the fluid bed. The resulting enlarged iron particles are withdrawn as product through outlet 30. Fine particles can be screened or otherwise separated from the product and returned to the fluidized bed to provide seed particles for further decomposition reactions. Heat to the fluidized bed for the endothermic decomposition reaction is provided by withdrawing iron particles through downcomer 31, lifting and heating them by means of hot inert gases, such as nitrogen, injected at inlet 32, and conveying them upwardly through riser 33 into cyclone separator 34. The heated solid particles are then returned to the fluid bed by means of standpipe 35, while the spent heating gas exits through line 36 from which it can be recycled through a heating furnace (not shown). Other techniques for heating the withdrawn iron particles can, of course, be used. The fluid bed can also be heated by injecting hot gases directly into the bottom of the bed. However, it is generally expensive and undesirable to handle the hot gases. Also, any extraneous gases would pollute the high purity carbon monoxide products from the decomposition reaction.

The invention will be better illustrated by reference to the following examples:

*Example 1*

This example illustrates that inert gases can be introduced with the carbon monoxide into the moving bed carbonyl formation zone to enhance the production of a gaseous carbonyl product. A synthesis gas containing 50% carbon monoxide and 50% hydrogen is injected into a carbonyl formation reactor substantially as shown in the attached drawing at the conditions given below:

| | |
|---|---|
| Temperature, ° F. | 230 |
| Pressure, p.s.i.g. | 500 |
| Gas rate, v./v./hr. | 2060 |
| Wt. percent conversion of iron | 31 |
| Carbon monoxide utilization, mole percent | 15 |

The iron material used in this example comprises particles of iron with about 5% gangue and unreduced iron ore and having a particle size ranging from about 150 to 450 microns. The ore is treated in a batch process for 8 hours and liberates a product which is almost entirely gaseous iron carbonyl. The upflowing synthesis gas stream produces a moving bed which collapses as the reaction progresses and causes the gangue and other impurities to descend to the bottom of the bed while the gaseous iron carbonyl product is recovered from the top of the bed.

*Example 2*

This example illustrates the improved carbon monoxide conversions which can be achieved using substantially pure carbon monoxide feed at relatively low feed rates. Carbon monoxide is introduced at a rate sufficiently low to avoid fluidization into the bottom of a moving bed of reduced particulate iron ore containing about 90% metallic iron and the remainder impurities. The operating conditions are as illustrated below:

| | |
|---|---|
| Temperature, ° F. | 275 |
| Pressure, p.s.i.g. | 500 |
| CO rate, v./v./hr. | 1480 |
| Hours of treatment | 3 |
| Wt. percent conversion of iron | 32 |
| Carbon monoxide utilization, mole percent | 32 |

The iron carbonyl resulting from this example is a very high purity gaseous material.

*Examples 3 and 4*

These examples show the improved conversions of carbon monoxide and iron in the moving bed that can be achieved by operating at high pressures in the carbonyl formation reactor. Substantially pure carbon monoxide is introduced in the same manner as described above into a moving bed of reduced iron ore at the following conditions:

| | | |
|---|---|---|
| Temperature, ° F. | 230 | 230 |
| Pressure, p.s.i.g. | 350 | 200 |
| CO Rate, v./v./hr. (inlet) | 1,930 | 1,632 |
| Hours of Treatment | 3 | 5 |
| Wt. percent Conversion of Iron | 24 | 19 |
| Carbon Monoxide Utilization, Mole percent | 26 | 17 |

As the data indicate, when the pressure is increased from 200 to 350 p.s.i.g., the carbon monoxide utilization increases from 17 to 26% even though a larger quantity of carbon monoxide is employed at the higher pressure, as indicated by the inlet feed rates.

Example 5

In this example finely divided reduced iron particles containing 90% metallic iron and 10% siliceous gangue material, as well as some unreacted FeO, are contacted at a pressure of about 200 p.s.i.g. and a temperature of 230° F. with carbon monoxide gas. The iron particles range in size from about 30 microns to about 5000 microns. The carbon monoxide is introduced into a moving bed of the particles at about 90° F. and at a rate of about 1000 v./v./hr. Reduced ore is introduced continuously at the top of the moving bed while gangue and impurities are withdrawn continuously from the bottom of the bed. As the carbon monoxide reacts with the iron, the bed slowly collapses. At lined-out conditions the carbon monoxide conversion or utilization is 27%. The effluent gases consist of about 5 volumes of gaseous iron carbonyl and 73 volumes of unreacted carbon monoxide gas which are removed from the top of the reactor.

The effluent gases are contacted in a suitable condenser with cooling water whereby the gaseous carbonyl is cooled and condensed to form a liquid. The uncondensed carbon monoxide and extraneous gases are separated from the liquid carbonyl.

The liquid carbonyl at a temperature of 90° F. is fed to a fluidized bed of finely divided iron seed particles, maintained at a temperature of about 300° F. in a decomposition reaction zone maintained at about the same pressure as the carbonyl formation zone of 30 p.s.i.g.

In the fluidized decomposition zone, fluidized finely divided particles are withdrawn continuously. As the liquid carbonyl is injected into the decomposition zone it rapidly vaporizes due to the higher temperatures and decomposes to deposit iron on the hot seed particles, causing them to increase in size. New seed particles are formed by attrition in the fluid bed as well as by nucleation of iron as it is formed from the decomposition. The solids, as they are continuously withdrawn from the reaction zone, are separated into particles larger than about 200 mesh and particles smaller than about 200 mesh. The particles larger than 200 mesh are separated and cooled and constitute a substantially pure iron product of 99.5% iron suitable for subsequent use for steelmaking purposes. The particles less than 200 mesh in size are contacted with nitrogen, which has been heated in a furnace to a temperature of about 800° F., and carried through a transfer line and separated in a gas-solids separatory device. The hot recycle seed particles, at a temperature of 750° to 800° F., are recycled to the decomposition zone. Most of the carbon monoxide generated from decomposition is recycled to the carbonyl formation zone.

Examples 6 and 7

These examples further illustrate the improved gas utilization that can be achieved in the carbonyl formation reactor by employing low carbon monoxide feed rates. The carbon monoxide is fed to a moving bed of particles of approximately 90% iron and 10% impurities having a size range from about 20 to 500 microns and averaging about 100 microns. Conditions of the bed are maintained as indicated below:

| | | |
|---|---|---|
| Temperature, °F | 230 | 230 |
| Pressure, p.s.i.g. | 500 | 500 |
| CO Rate, v./v./hr | 1,710 | 585 |
| Carbon Monoxide Utilization, Mole percent | 38 | 77 |

At these high conversions the amount of free unreacted carbon monoxide gas present is sufficiently small that substantially all of the iron carbonyl remains as a liquid and is drained from the bottom of the moving bed along with gangue and impurities.

Example 8

In this example liquid carbonyl is formed in a carbonyl formation reactor by contacting high-purity (99%) carbon monoxide at a temperature of about 80° F. with finely divided reduced iron oxide containing 90% metallic iron. The pressure in the reactor is maintained at 500 p.s.i.g. and the reaction temperature is maintained at 230° F. by introduction of the cool carbon monoxide at about 1000 v./v./hr. Liquid carbonyl droplets collect and gravitate toward the bottom of the reactor together with small amounts of unreduced iron oxide, unreacted iron and siliceous gangue material. The reaction products are withdrawn and water-washed and allowed to settle into two liquid layers, a bottom liquid carbonyl layer containing settled iron particles and a top water layer containing gangue impurities. The gangue material is removed by overflow into a suitable settling device and the heavy iron and oxide particles are separately removed from the bottom of the liquid carbonyl layer.

The liquid carbonyl is withdrawn and cooled to a temperature of about 80° F. prior to being introduced into a carbonyl decomposition reactor. Liquid carbonyl is injected at several points into a fluid bed of finely divided iron solids of an average particle size of about 100 mesh. The fluid bed is maintained at a temperature of 250° F. by recycle of hot −200 mesh iron particles which are heated in a separate fluid bed by direct contact with a hot, inert gas. The recycle fines are added to the reactor and act as seed particles for the deposition of iron from the decomposition of iron carbonyl. The reactor is maintained at a low pressure of 20 p.s.i.g., which accelerates the decomposition of the carbonyl.

Under the conditions at which the carbonyl formation reaction is carried out a gas utilization of about 38% is achieved. The carbon monoxide generated by decomposition of the carbonyl is recycled through a compressor back to the carbonyl formation reactor at 500 p.s.i.g.

In accordance with this process, iron of 99+% purity is obtained as product.

Example 9

This example illustrates the improvement in iron and carbon monoxide conversions that can be achieved by pretreating difficultly-reacting iron with carbon monoxide at static conditions prior to adding the iron to a moving bed carbonyl formation zone. As the following data illustrate, iron particles without a carbon monoxide pretreatment were found to undergo negligible reaction with carbon monoxide in a moving bed carbonyl formation zone after 4 hours of treatment. On the other hand, by pretreatment with carbon monoxide for 3 hours at 300° F. and 900 p.s.i.g., excellent conversions were obtained.

| | None | Static CO |
|---|---|---|
| Pretreatment: | | |
| Temperature, °F | | 300 |
| Pressure, p.s.i.g. | | 900 |
| Hours | | 3 |
| Carbonyl Formation: | | |
| Temperature, °F | 230 | 230 |
| Pressure, p.s.i.g. | 500 | 500 |
| CO Rate (inlet), v./v./hr | 790 | 800 |
| Hours of Treatment | 4 | 3 |
| Wt. percent Conversion of Iron | Nil | 13.2 |
| Carbon Monoxide Utilization, Mole percent | Nil | 25 |

As will be appreciated by one skilled in the art, the extremely high purity of the product and the process advantages which can be achieved in accordance with this invention are various and substantial. The preceding examples are intended to be illustrative and many modifications and variations will also be apparent to one skilled in the art of iron purification.

What is claimed is:

1. A process for purifying a mixture of particles of iron and impurities comprising forming a moving bed of said particles,
   adding the mixture to the top of the bed,
   passing carbon monoxide-containing gas upwardly through the bed at a rate sufficient to maintain said particles as a moving bed but insufficient to fluidize the bed,
   reacting the iron and carbon monoxide to form iron carbonyl,
   withdrawing said impurities from the bottom of the moving bed, and
   withdrawing said iron carbonyl from the moving bed and decomposing the carbonyl to form high purity iron and carbon monoxide.

2. The process of claim 1 wherein said particles are substantially all within the size range from about 5 to 5000 microns and average about 50 to 350 microns.

3. The method of claim 1 wherein said mixture is pretreated for at least about 10 minutes with carbon monoxide at pressures in the range from about 500 to 2500 p.s.i.g. and temperatures in the range from about 200° to 400° F. before being added to said bed.

4. The process of claim 1 wherein said reaction is carried out at pressures in the range from about 200 to 500 p.s.i.g. and at temperatures in the range from about 100° to 350° F.

5. The process of claim 4 wherein said gas is passed upwardly through the bed at a rate sufficient to produce a carbonyl product which is substantially all gaseous.

6. The process of claim 4 wherein said gas is passed upwardly through the bed at a rate sufficiently low to produce a carbonyl product which is substantially all liquid.

7. The process of claim 1 wherein said withdrawn carbonyl is decomposed in a fluidized bed of seed iron particles.

8. The process of claim 7 wherein heat is added to said fluidized bed in an amount sufficient to decompose said carbonyl by withdrawing seed particles from the bed, heating the withdrawn particles to a temperature higher than the temperature of the bed and returning the heated particles to the bed.

9. The process of claim 8 wherein said bed is maintained at temperatures in the range from about 100° to 350° F. and pressures below about 100 p.s.i.g.

10. The process of claim 8 wherein said carbonyl is withdrawn from the moving bed as a gas and is condensed and added to said fluid bed as a liquid.

11. The process of claim 8 wherein said carbonyl is withdrawn from the moving bed as a liquid and added to said fluid bed as a liquid.

12. The process of claim 11 wherein said withdrawn liquid carbonyl is washed with water to remove impurities before being added to said fluid bed.

13. The process of claim 8 wherein said carbonyl is added to the fluidized bed at a temperature less than about 100° F.

14. A process for purifying a mixture of particles of iron and impurities having particle sizes in the range from about 5 to about 5000 microns, and averaging about 50 to 350 microns, comprising forming a moving bed of said particles,
   adding the mixture to the top of the bed,
   passing carbon monoxide-containing gas upwardly through the bed at superficial gas velocities in the range from about 0.002 to about 0.2 ft./sec. and insufficient to fluidize the bed,
   reacting iron and carbon monoxide in the bed at temperatures in the range from about 100° to about 350° F. and pressures in the range from about 200 to about 500 p.s.i.g. to form iron carbonyl which is substantially all liquid,
   withdrawing the liquid carbonyl, impurities and unreacted iron from the bottom of said bed,
   separating the unreacted iron and impurities from said carbonyl by washing the carbonyl with water and settling the carbonyl,
   adding the washed and settled carbonyl at temperatures less than about 100° F. to a fluidized bed of seed iron particles at temperatures ranging from about 100° to 350° F. and pressures less than about 50 p.s.i.g.,
   maintaining the temperature of said fluidized bed by withdrawing seed iron particles therefrom, heating the withdrawn particles to a temperature higher than the temperature of the bed and returning the heated particles to the bed,
   decomposing the iron carbonyl in said fluidized bed to form high purity carbon monoxide and iron, and recovering said high purity iron from the fluidized bed.

References Cited

UNITED STATES PATENTS

| | | | |
|---|---|---|---|
| 1,759,268 | 5/1930 | Mittasch et al. | 23—203 |
| 1,759,659 | 5/1930 | Mittasch et al. | 23—203 |
| 1,828,376 | 10/1931 | Muller-Cunardi | 23—203 |
| 2,242,115 | 5/1941 | Danciger | 23—203 |
| 2,378,053 | 5/1945 | Wallis et al. | 23—203 |
| 2,561,396 | 7/1951 | Matheson | 75—26 |
| 2,884,319 | 4/1959 | Fabian et al. | 75—0.5 |
| 3,113,018 | 12/1964 | Young | 75—81 |

FOREIGN PATENTS 695,925   8/1953   Great Britain.

HYLAND BIZOT, *Primary Examiner.*

DAVID L. RECK, *Examiner.*

W. STALLARD, *Assistant Examiner.*